Aug. 11, 1970    S. H. WILLIAMS ET AL    3,523,435
APPARATUS FOR PRODUCING HEAT INDUCED EFFECTS
ON FLEXIBLE SUBSTRATES
Filed June 13, 1969    2 Sheets-Sheet 1

INVENTOR
SUMNER H. WILLIAMS
Joseph Reid ELLIS
BY Martin Smolowitz
Samson B. Leavitt
ATTORNEYS

United States Patent Office 3,523,435
Patented Aug. 11, 1970

3,523,435
APPARATUS FOR PRODUCING HEAT INDUCED EFFECTS ON FLEXIBLE SUBSTRATES
Sumner H. Williams, Short Hills, N.J., and Joseph Reid Ellis, Easton, Pa., assignors to GAF Corporation, New York, N.Y., a corporation of Delaware
Continuation-in-part of applications Ser. No. 614,520, Feb. 7, 1967, Ser. No. 660,167, Aug. 3, 1967, and Ser. No. 810,323, Mar. 25, 1969. This application June 13, 1969, Ser. No. 833,128
Int. Cl. D06c 23/00; D06p 7/00
U.S. Cl. 68—13                    17 Claims

ABSTRACT OF THE DISCLOSURE

Apparatus for producing a chemical reaction or physical change on a flexible substrate, e.g., textile fabric, which comprises: a first means to apply a liquid reagent to such flexible substrate; a first heating means adapted to apply heat to a first face of such flexible substrate, the first heating means comprising a first series of rollers so arranged that the flexible substrate is made to travel an undulating or sinusoidal path around such rollers, such path being one whereby a first face of the flexible substrate is brought into contact with rollers heated at a temperature of from 500 to about 1500° F.; a second means to apply a second liquid reagent to the flexible substrate; and a second heating means subsequent thereto and adapted to apply heat to the second face of the flexible substrate, such second heating means comprising a second series of rollers so arranged that the flexible substrate is made to travel an undulating or sinusoidal path around such rollers, whereby the second face of the flexible substrate only is brought into contact with rollers heated to a temperature of from about 500 to 1500° F. Preferably, each heated roller of the first and second series of rollers is practically surrounded by a heat shield, at least one of the rollers of each of the first and second series carrying a three-dimensional pattern. Additionally, one or more of the rollers of each of the first and second series of rollers is preferably adjustable in position so as to be raised out of alignment with the other rollers of the first or second series so as to eliminate the undulatory or sinusoidal travel of the flexible substrate.

---

This application is a continuation in part of copending applications Ser. No. 810,323 filed Mar. 25, 1969, Ser. No. 614,520 filed Feb. 7, 1967, and Ser. No. 660,167 filed Aug. 3, 1967.

In copending application Ser. No. 614,520 filed Feb. 7, 1967, a process and apparatus is disclosed for an improvement in the customary practice of dyeing fabrics. Thus, the invention which is disclosed in such copending application comprises an improvement over the conventional process and apparatus wherein a fabric to be dyed is passed through a trough containing a dye whereby the fabric is padded to a substantially uniform shade or intensity and subsequently treated with a second dye after drying to provide a multi-colored effect on the opposite side of the material. Thus, in accordance with the invention disclosed in such copending application, it was determined that by application of the principle of physical or chemical change causing migration, previously considered detrimental to a dyeing process, it could be possible to provide a patterned or multi-colored effect, i.e., an effect involving the formation of contrasting colors by subjecting a fabric material containing a dye or chemicals capable of being migrated to the action of a heated die or roller maintained at an elevated temperature. Thus, the apparatus disclosed in such copending application included means to impregnate the textile fabric with a liquid substance having migrating properties; a heated roller or die having the desired pattern; and transport means for transporting the textile material over the die or roller and in contact therewith. By application of the principle of migration such apparatus as disclosed in the aforementioned copending application is capable of producing the desired patterned effect since the dye tended to migrate to those areas of the fabric in contact with the heated die or roller.

In addition to the aforementioned means associated with such apparatus for developing a pattern on the surface of a textile material, such apparatus includes guide rollers which guide the textile material around the patterned or plain roller which because of their adjustable nature, are capable of controlling the extent of circumferential contact of the textile fabric with the heated roller.

In accordance with such apparatus, the production of the patterned effect on the textile or other flexible material could be achieved through contact of the textile or other flexible fabric with the heated roller for a period of time of from ½ to 5 seconds, a time period much shorter than that achieved through any conventional means used in the present art.

An improvement over such process and apparatus for effecting the physical migration of dyes to produce a multi-colored or patterned effect on a textile fabric is set forth in a further copending application Ser. No. 660,167 filed Aug. 3, 1967. Such copending application describes an improved process and apparatus whereby the desired pattern is obtained on a textile fabric by preferentially migrating one dye or colorant over another. This is achieved by employing a means to dye the textile fabric with a first material having a certain background color; means to dye such textile material with a second color; and means to migrate and fix only the second color, such means again being a heated die or roller. In an alternative method employing alternative apparatus a means to migrate the first color is employed subsequent to the first means to dye the textile fabric, the fabric having the migrated color being then passed through a second means, i.e., second bath, containing a second coloring agent together with reagents to reduce the migrated and second background color in order to fix them to the textile material. In accordance with still a further embodiment of such copending application a single color is migrated by means of a pattern carrying roller applied to one surface, the material being then contacted at its other surface with a heated roller to migrate the remaining dye in the other direction with respect ot the thickness of the material. In such manner, it is possible to provide a dyed textile fabric wherein the contrast of dye migrated in the first direction by the first roller is enhanced.

A still further improvement over each of the processes and apparatus as set forth in the above-discussed copending applications is found in copending application Ser. No. 810,323 filed Mar. 25, 1969. Such copending application is directed to a process and apparatus for producing heat induced effects on textile fibers and fabrics. Thus, in accordance with the process and apparatus disclosed in such copending application, it has been discovered that by contacting locally a textile fabric or fiber containing a liquid reagent, it is possible not only to produce a patterned effect through the physical migration of dyes, chemicals, or similar pigments, but many other chemical reactions and physical changes can be effected. Thus, for example, such apparatus as disclosed in this copending application can be employed for the heat fixation of dyes, chemicals, or pigments; for the development of dyes, chemicals, or pigments by the reaction of two or more components or by heat-induced transformation of an intermediate; for the curing of crease-proofing agents, cross-linking agents, synthetic resins, natural gums, etc.; for the discharging or destroying of dyes, pigments, etc.; or for the drying of the flexible substrate. Thus, any and all of such chemical reactions and physical changes can be achieved on the textile fabric by contact of the same with one or more heated dies or rollers maintained at a temperature of from about 500 to about 1500° F., the contact with the heated surface being within a very short period of time, i.e., a fraction of a minute or second. Thus, it has been found in accordance with the invention developed and disclosed in such copending application that any and all of such chemical reactions or physical changes on the textile fabric or similar flexible substrate can be improved with respect to reproducibility and time by treating the textile fabric or similar substrate for a very short period of time by contact with the heated die or roller.

Here again, the apparatus disclosed in this last mentioned copending application Ser. No. 810,323 generally comprises means for applying the necessary reactants or reagents for the chemical reaction or physical change to the flexible substrate; means to effect the chemical reaction or physical change through the application of heat, such means comprising at least one roller heated to a temperature within the range of about 500 to about 1500° F.; and means to transport the flexible substrate through such aforementioned means. It is additionally specified in accordance with the apparatus disclosed and claimed in such copending application that it is preferable that at least one roller carries a three-dimensional pattern and such apparatus additionally contains means to remove moisture from the flexible substrate, i.e., textile fabric, as the same leaves the means for applying the necessary reactants or reagents.

While all of the processes and apparatus disclosed in the aforementioned copending applications are extremely satisfactory for producing certain heat-induced effects on flexible substrates, particularly textile fabrics, a still further improved apparatus has been developed in accordance with the present invention. Thus, the present invention is directed to an improved apparatus for producing any and all of the above-described heat-induced effects by the provision of a multiplicity of series of rollers having the ability to sequentially treat opposite sides of a flexible substrate, thereby producing distinct colorings of each side of the material by the use of two pad applications each containing different formulations, being applied in a continuous apparatus as shown.

Thus, such apparatus in accordance with the present invention generally comprises a first means to apply a suitable liquid reagent to a suitable flexible substrate, i.e., textile fabric; a first heating means subsequent thereto to apply heat to a first face of the flexible substrate; a second means to apply a second liquid reagent to the flexible substrate subsequent to passage of the same over the first heating means; and a second heating means subsequent to second means to apply a second liquid reagent, the second heating means being adapted to apply heat to the second face of the flexible substrate. Each of the first and second heating means comprises a series or rollers so aligned that the flexible substrate is forced to follow an undulatory or sinusoidal path over each of said first and second heating means, the heated rollers of said first and second series of rollers being maintained at a temperature of from about 500 to about 1500° F.

Employing such apparatus, it has been discovered in accordance with the present invention that it is possible to produce enhanced multi-color effects in a continuous manner through the sequential treatment of alternating sides of the flexible substrate and possible to produce similar chemical reactions and physical changes in a manner involving substantial ease of operation and results not heretofore obtainable.

Accordingly, a principal object of the present invention relates to an improved apparatus for providing or producing heat-induced effects on flexible substrates, e.g., textile fabrics, which apparatus improves that of the prior art by allowing for the production of effects in a manner not heretofore possible.

It is yet a further object of the present invention to provide such novel apparatus for the production of heat-induced effects on flexible substrates, which apparatus allows for the sequential treatment of both sides of such flexible substrate, such treatment being capable of inducing a physical change or chemical reaction.

Yet a further object of the present invention relates to such novel apparatus wherein through means capable of alternately treating through contact the front and back of a flexible substrate, i.e., textile fabric, containing reagents capable of providing a chemical reaction or physical change, it is possible to provide for effects in a manner not heretofore obtainable with conventional prior art apparatus.

A still further object of the present invention comprises such novel and improved apparatus wherein the heating means employed comprises first and second series of rollers, the first series of rollers capable of heat treating one face of a flexible substrate, the second series of rollers being capable of heat treating the other face.

Yet a further object of the novel apparatus of the present invention comprises such apparatus including a first means to apply a chemical reagent to a flexible substrate, i.e. textile fabric, a first heating means as described above, a second means to apply a second reagent to the flexible substrate, and a second heating means as previously described.

A still further object of the novel apparatus of the present invention comprises such apparatus additionally containing means to eliminate moisture from the flexible substrate and means to guide the flexible substrate through the aforementioned heating means.

Still further objects of the novel apparatus of the present invention will become more apparent from the following more detailed description thereof in connection with the accompanying drawings wherein.

Figure 1:
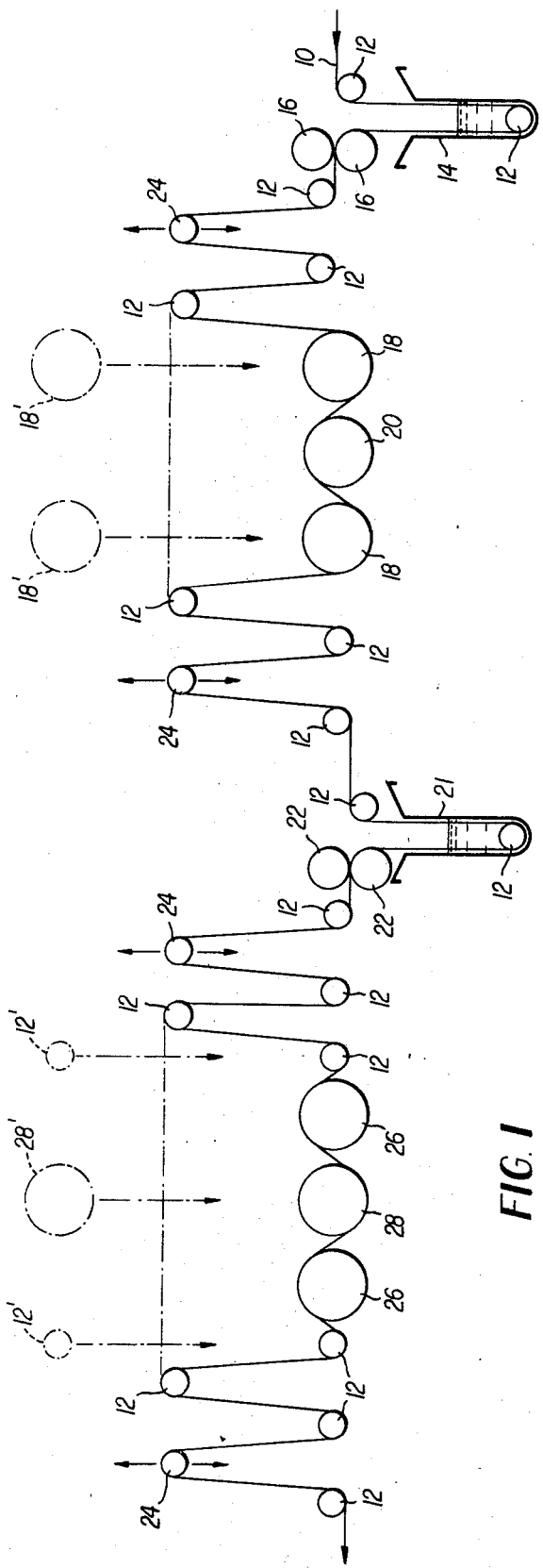
FIG. 1 is a schematic view of the apparatus in accordance with the present invention.

Referring now to the drawings wherein like reference numerals designate like or corresponding parts throughout the various views, there is shown in FIG. 1 a continuous flexible substrate, such as a textile fabric 10, which may, for example, be a cotton twill or similar material. The flexible substrate 10 is passed over a guide roller 12, in the form of a suitable input roller, and subsequently into a suitable vessel 14, i.e., a pad box or dye vat or a similar means capable of applying a liquid reagent to the flexible substrate 10. The particular composition of the liquid reagent, i.e., dye, etc., will depend upon the chemical reaction or physical change that is desired through subsequent utilization of the apparatus of the present invention. With respect to the migration of dyes, the only important requirement for the liquid reagent or dye in the pad box or dye vat 14 is that such material have the ability to migrate in the flexible substrate under the influence of subsequently applied heat.

After the flexible substrate 10 is passed through vessel 14 and the liquid reagent impregnated thereon the flexible substrate 10 is preferably passed through squeeze rollers 16 wherein a portion of the liquid reagent is removed so as to control the moisture content of the flexible substrate 10. Generally, by passing the flexible substrate 10 through squeeze rollers 16 the moisture content of the flexible substrate 10 is controlled so that the same is within the range of about 30% to about 125% by weight based on the weight of the dry flexible substrate, the moisture content being preferably in the region of about 75% by weight. As shown in FIG. 1, squeeze rollers 16 are preferably arranged in such a manner that any excess liquid reagent is returned automatically, for example, by gravity to vessel 14.

The flexible substrate 10, after leaving the squeeze rollers 16, passes over a number of guide rollers 12 and compensater rollers 24. The guide rollers 12 merely guide the flexible substrate 10 through the apparatus of the present invention while the compensater rollers 24 act to maintain the proper position and tension within the flexible substrate 10. Such compensater rollers 24 may be adjustable in position, weighted, spring loaded, or otherwise suitably arranged in a manner well known in the art.

The flexible substrate 10 containing the suitable chemical reagent from the first vessel 14 is then passed over a heating means comprising a series of heated and unheated rollers 18 and 20, respectively. As shown in FIG. 1, such series of rollers 18 and 20 are shown to be three in number although it should be obvious that any number can be advantageously utilized. In accordance with the present invention, the series of rollers is so arranged that the flexible substrate 10 is caused to take a sinusoidal or undulating path around the rollers whereby one face only of the flexible substrate 10 is brought in contact with the heated surfaces. In accordance with the embodiment of the present invention illustrated in FIG. 1, the first and third rollers 18 are heated, such rollers being in contact with the upper or top face of the flexible substrate 10. The rotation of the rollers 18 and 20 of the first series of rollers comprising the first heating means is preferably accomplished through a motor, chain drive, and sprocket arrangement (shown in FIG. 2) whereby the rotation and speed of rollers can be accurately regulated.

Preferably, but not necessarily, in accordance with the present invention, at least one of the heated rollers 18 carries a three-dimensional design or pattern. The use of a heated roller 18 having a three-dimensional pattern or design is particularly advantageous wherein the apparatus of the present invention is utilized to achieve localized chemical reactions or physical effects upon the moving flexible substrate 10. Thus, by providing a raised pattern or design on the heated roller 18 only the raised portion is in contact with the moving flexible substrate 10 to the effect that the heat of the heated roller 18 is localized at such points of contact. Accordingly, using the physical migration of dyes as an example, by employing the heated roller having a three-dimensional pattern or design it is possible to produe a multi-tone effect since the dye would be preferentially migrated to those areas only which are contacted by the heated member. This, therefore, can produce any type of desired design based solely upon the design or pattern of the roller. Such use of a heated die or roller having a three-dimensional pattern or design so as to effect a multi-tone product through the migration of dyes, pigments, and similar materials is more fully discussed in copending application No. 810,323 filed Mar. 25, 1969, the disclosure of which is herein incorporated by reference.

Additionally, while not being shown in FIG. 1, it is preferable in accordance with the present invention that each of the heated rollers 18 have associated therewith a heat shield located partially or substantially around the heated roller 18 but allowing sufficient space so that the flexible substrate can pass in contact with the heated roller without contacting the heat shield. Such heat shield, of course, has the obvious function of reflecting the heat back to the area of the heated roller so that excessive heat does not escape to the surrounding areas. Such heat shields are generally about ½ to 1 inch away from the roller and are produced from a conventional material, i.e., asbestos, calcilite, etc., capable of reflecting the heat back to the area of the heated rollers 18.

As indiated previously the second or middle roller 20 is preferably a roller which is not heated and which need not be capable of being raised out of alignment with the other rollers of the series of rollers of the first heating means. Accordingly, by providing the middle or second roller 20 as one which is unheated, the flexible substrate 10 when traveling the undulating path around the rollers 18 and 20 will be contacted on only one face, i.e., the upper face, with the heated rollers 18. This, therefore, allows a preferential chemical reaction or physical change to take place at this point in the apparatus only on the upper face of the flexible substrate 10.

Figure 2:
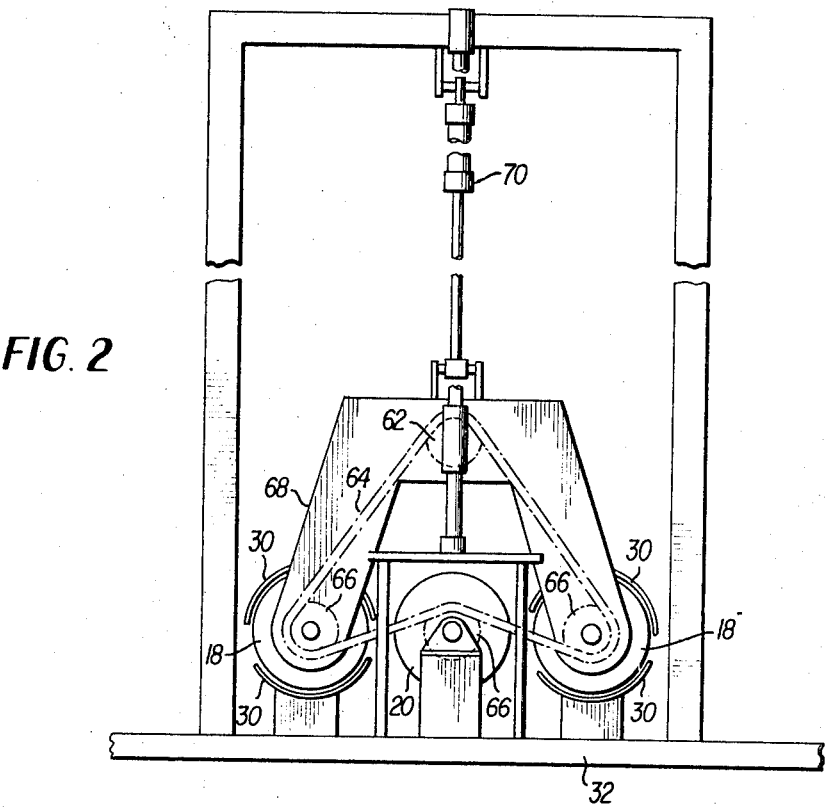
FIG. 2 is an enlarged schematic view of the first heating means of FIG. 1 showing the manner by which the rollers are driven and raised out of alignment.

Turning to FIG. 2, the above described heating means of FIG. 1 is more clearly shown. Here again, it can be seen that the flexible substrate 10 is caused to follow a sinusoidal or undulating path around rollers 18 and 20, such rollers constituting the series of rollers of the first heating means.

As seen in FIG. 2, the first and third rollers, i.e., those rollers heated in accordance with the present invention, rollers 18, are attached to a frame 68 by which such rollers 18 can be lifted transversely to the direction of the movement of the flexible substrate 10 so as to move the same out of alignment with the remaining roller 20 not so attached to the frame 68. Such lifting of the frame 68 and attached rollers 18 is achieved through the provision of a hydraulic lift schematically illustrated by reference to hydraulic cylinder 70. The features of such an hydraulic system capable of lifting frame 68 and associated rollers 18 is, of course, well known and well adaptable to the apparatus of the present invention.

Frame 68 also has attached to the same a motor 62, the motor 62 being capable of driving the rollers 18 and 20 through a drive chain 64 and sprockets 66 associated with each of the rollers 18 and 20.

As can be seen from FIG. 2, the motor 62 attached to the frame 68, being of any conventional type electric or similar motor, permits the constant movement of the three rolls illustrated through the provision of a single chain drive mechanism. Thus, as represented in FIG. 2, the motor 62 through chain 64 and sprocket 66 will drive the first or entry roller 18 in a clockwise direction, the second or middle roller 20 in a counter-clockwise direction and the third or exit roller 18 in a clockwise direction. This, of course, allows for the contact of the flexible substrate 10 on its upper top surface only with the heated rollers 18.

As can be seen from the schematic representation in FIG. 2, when frame 68 is lifted through the hydraulic lift and associated hydraulic cylinder 70, sprocket 66 of roller 20 will become disengaged from chain 64 to the effect that the rotation of roller 20 will stop. When in operational position, however, chain 64 becomes engaged with sprocket 66 so that the in concert movement or rotation of the rollers as aforementioned takes place. It will also be observed from FIG. 2 that the arrangement illustrated is such that due to the fact that the rollers 18 and motor 62 are attached to frame 68 capable of being lifted through the hydraulic cylinder 70, the entire chain drive mechanism is lifted out of operational alignment upon the upward movement of frame 68.

Additionally, while not illustrated in FIG. 2, the apparatus of the present invention, specifically, the first and second heating means, can additionally have an overriding clutch associated with the motor and chain drive mechanism so as to permit faster speeds when the rollers are in alignment or to permit the disengagement of the heated rollers 18 when in the raised position 18'.

As indicated previously with respect to FIG. 1, each of the heated rollers 18 preferably has a heat shield 30 associated therewith. As shown in FIG. 2 such heat shield 30 associated with each of the heated rollers 18 is composed of one or more upper and lower sections surrounding the heated roller yet allowing sufficient space for passage of the flexible substrate 10 in contact with the heated rollers 18. Such heat shields 30 are preferably spaced about ½ to 1 inch away from the roller so as to allow the contact of the flexible substrate 10 with the heated roller 18 yet retain the substantial portion of the heat in the areas of the roller. As shown in FIG. 2, the upper sections of the heat shield 30 are preferably attached to movable frame 68 so as to be moved therewith while the lower sections of the heat shield 30 are permanently affixed to the support 32 of the apparatus.

Figure 3:
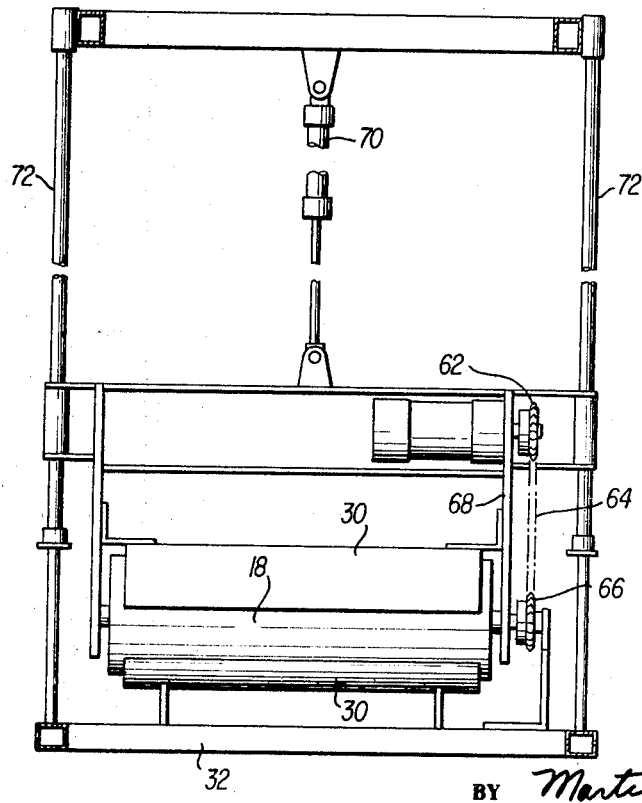
FIG. 3 is a schematic view of the enlarged view of FIG. 2 taken from the exit side of the apparatus.

All of the features discussed above with respect to FIG. 2 are shown in FIG. 3 which is a side view of the heat treating member as shown in FIG. 2. This figure additionally illustrates the provision of guide rails 72 attached to the hydraulic system and employed to maintain the guide rollers in the proper position and alignment when raised in accordance with the procedure described above.

As can be seen from FIG. 1, when heated rollers 18 are raised in position 18′ through means as illustrated in connection with FIGS. 2 and 3, the flexible substrate 10 does not travel the undulatory or sinusoidal path around the rollers 18 and 20 but merely travels in a straight path between guide rollers 12. When the heated rollers 18 are in operative position, that is, form a series of heated and unheated rollers, the flexible substrate is caused to travel such undulatory or sinsoidal path such that one face of the flexible substrate 10 is brought into contact with the heated rollers 18.

After leaving the last heated roller 18 the flexible substrate 10 then passes over a number of guide rollers and compensating or tension rollers again employed to maintain the tension of the system at its proper level. Thus, the compensator or tension rollers 24 are employed as take-up devices with the proper tension to make certain that enough cloth is available to engage the rollers when the heated rollers in series are in operative position. When the heated rollers are retracted the compensating or tension rollers take up slack in cloth to their normally idle position.

After passing over a series of guide rollers 12 and tension rollers 24, the flexible substrate 10 is caused to pass into a second vessel 21 capable of applying a second liquid reagent to the flexible substrate 10. Such second vessel 21 preferably comprises a dye or chemical pad or vat. When employing the apparatus of the present invention to produce a multi-color effect through the migration of dyes this second vessel 21 would contain a suitable dye which when padded onto the flexible substrate 10 and subsequently contacted with heated rollers would be capable of being migrated.

After passing through the suitable vessel for applying the second liquid reagent 21, the flexible substrate 10 would aagin preferably pass through squeeze rollers 22 which again control the moisture content of the flexible substrate 10. Here again, squeeze rollers 22 are arranged so that the moisture content of the flexible substrate 10 leaving squeeze rollers 22 is within the range of 30 to 125% by weight based upon the weight of the dry flexible substrate 10. Again, such squeeze rollers 22 are arranged so that the excess moisture removed from the flexible substrate 10 flows back through gravity into vessel 21.

After passing over the last of guide rollers 12 as shown in FIG. 1, the flexible support 10 is passed into contact with a second heating means comprising a plurality of rollers, again shown as three in FIG. 2. Thus, in accordance with the embodiment shown in FIG. 1, the flexible support 10 first contacts a heated roller 16 then an unheated roller 28 and last a second heated roller 26. As seen in FIG. 1, the relationship of the rollers constituting this second heating means is such that the flexible substrate 10 is caused to contact the heated rollers 26 only on that surface not contacted by the heated rollers when the flexible substrate 10 passes through the first heating means. Accordingly, such an arrangement allows for the sequential heat treatment of opposite faces of the flexible substrate 10 so as to allow for the sequential effecting of chemical reactions or physical changes on opposite faces of the suitable flexible material.

As shown in FIG. 1, both the guide rollers immediately prior to and preceding the series of rollers and the middle unheated roller 28 are adjustable in position to positions 12′ and 28′. Here again, this is done so as to provide for a means by which the sinusoidal or undulatory travel of the flexible substrate 10 can be omitted when operation of the heating means is not desired or where prolonged contact of the flexible substrate 10 with the heated rollers 26 must be avoided so as to eliminate any deleterious effects. This may occur, for example, wherein the apparatus malfunctions for some reason and prolonged contact of the flexible substrate 10 with the heated rollers 26 may cause damage to the flexible material.

While not specifically illustrated, it is pointed out that the drive mechanism employed to drive the heated and unheated rollers of this second heating means is essentially the same as that described in connection with FIGS. 2 and 3. In this regard, a motor including a chain drive is employed and associated with sprockets attached to each of the rollers 26 and 28 so that the same operate in concert to provide a constant rotational speed of the rollers of this second series of rollers constituting the second heating element. In accordance with the embodiment as shown in FIG. 1 the motor, chain drive, and sprocket arrangement would be such that the first or entry roller 26 would rotate in a counter-clockwise direction, the middle roller would rotate in a clockwise direction, and the third or exit roller 26 would rotate in a counter-clockwise direction. Here again, this allows for a contact of the flexible substrate 10 with the heated rollers 26 only on the face not contacted by the heated rollers in the first heating means, i.e., in the case illustrated in FIG. 1, the bottom or back surface. Again, this allows the apparatus of the present invention to be employed from the sequential contacting of alternate faces of the flexible substrate to provide a heat-induced chemical reaction or physical change.

Additionally, while not illustrated, the means to lift middle roller 28 and guide rollers 12 initially preceding and after the series of rollers constituting the second heating means is essentially the same as previously described with respect to FIGS. 2 and 3 in connection with the first heating means employed in accordance with the apparatus of the present invention.

Similarly, while not illustrated in connection with FIG. 1, each of the heated rollers 26 in this second series of rollers, preferably has a heat shield associated therewith so as to again concentrate the heat in the area of the roller while still allowing effective contact of the flexible substrate 10 with the heated rollers 26. The heat shields associated with the heated rollers 26 of this second series of rollers are essentially the same as those previously described in connection with FIGS. 2 and 3 with regard to the first series of rollers constituting the first heating means of the apparatus of the present invention.

After leaving the second heating means comprising the second series of heated and unheated rollers 26 and 28, the flexible substrate 10 is then passed over a number of guide rolls and compensating rolls and subsequently to a suitable take-up device not illustrated.

An example of the utilization of the apparatus illustrated in FIGS. 1 through 3 can be shown as follows:

Thus, for example, an 80 x 80 desized and bleached cotton fabric 10 is passed through a pad bath 14 containing a vat color dispersion made, for example, with 2.0 ounces per gallon Indanthrene Olive T 3R Infra Paste and 0.2 ounce per gallon of Nekal NF (GAF—sodium alkylnaphthalene sulfonate wetting agent), squeezed through squeeze rollers 16 to a moisture retention of 60% and passed at a speed of 40 yards per minute in contact with 3 six-inch cylinders 18 and 20 so as to migrate the dye-stuff to the upper surface of the fabrics. In this connection, the arrangement of the 3 six-inch cylinders is such that the middle roller 20 is cold or unheated, the upper surface of the cotton fabric 10 only contacting the first and third rollers 18 maintained at a temperature of about 1000° F. Somewhat similar migration results could be obtained by contact with a single hot roller at a speed of 20 yards per minute. The contact with the multiplicity of rollers, however, is preferred in accordance with the present invention. By this treatment, almost 100% of the olive dyestuff is transferred to the upper side of the fabric, leaving the lower surface of the fabric slight off-white.

The fabric 10 is then padded through a second vat color dispersion in pad box 21, the vat color dispersion being made with 2.0 ounces per gallon of Indanthrene Brilliant Green BN Infra Double Paste and 0.2 ounce per gallon of Nekal NF. The fabric 10 so padded is squeezed to a moisture retention of about 60% and passed in contact with the second series of rollers 26 and 28, the first and third rollers 26 being maintained at a temperature similar to that set forth above, the degree of contact being similar as with respect to the first heat treating means. In accordance with this heat treatment, however, it is noted that by the arrangement of rollers 26 and 28, the fabric is contacted with the heated rollers 26 only with the off-white surface. By such treatment substantially all of the green dye is migrated to the off-white surface of the fabric thereby producing a single-ply fabric dyed a distinct olive shade on one side and a distinct green shade on the other side.

Such a fabric can then be passed through a conventional reducing bath containing, for example, 8 ounces of caustic soda and 8 ounces of sodium hydrosulfite per gallon with subsequent developing or affixing of the dye in the usual manner by steaming, washing, oxidizing, soaping, rinsing, and drying.

Figure 4:
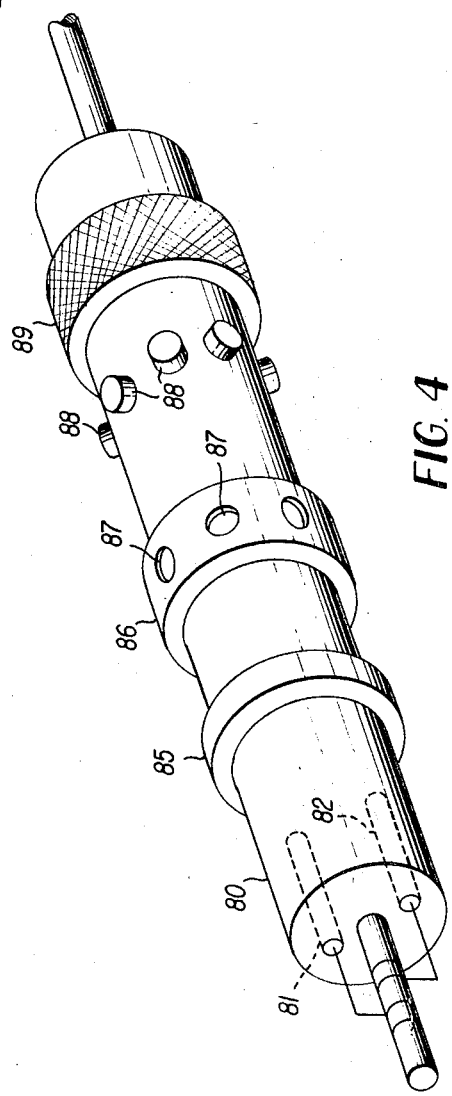
FIG. 4 is a schematic view of an exemplary heated roller in accordance with the apparatus of the present invention.

It should be pointed out that any desired variation in the above procedure can be obtained by suitably adjusting the squeeze rollers to other degrees of moisture retention, and/or variations in the fabric speed, degree of contact with the hot rollers, temperature of the hot rollers, etc. In addition, it should be noted that the above description of a suitable method of employing the apparatus of the present invention has been described primarily with respect to the employment of smooth rollers, since as indicated above, the procedure results in a single-ply fabric dyed a distinct olive shade on one side and a distinct green shade on the other side. In accordance with the present invention, however, it is possible to produce localized effects and greatly varying contrasting effects by the employment of patterned or designed rollers instead of smooth or uniformly knurled rollers as described above, Thus, for example, a suitable roller which can be employed in accordance with the apparatus of the present invention can have a configuration such as shown in in FIG. 4. Thus, for example, such a pattern carrying roller as shown in FIG. 4 may consist of a cylindrical element 80 supplied with means to heat the element, shown, for example, as internal electrical heating units 81 and 82 suitably connected internally and brought out to electrical contacts by, for example, slip rings, as is well known in the art (and as only schematically illustrated in FIG. 4), for further connection to a supply of electrical power. Thus, for example, the heating elements 81 and 82 within the hollow shell 80 of the pattern carrying roller can comprise conventional quartz elements capable of producing the necessary heat at the surface of the roller.

In order to produce a longitudinal stripe pattern, for example, through the migration of a dye using such a pattern carrying roller, cylindrical body 80 is supplied with a circumferential ridge 85. Thus, using the above descirbed procedure for utilization of the apparatus of the present invention if the heated rollers of the first heating means contain only such circumferential ridges, the initial migration would produce a fabric having an upper surface which contained rather well-defined ridges of a deep olive coloration upon a lighter background.

The remaining types of three-dimensional designs shown in connection with FIG. 4 are representative of those which can be employed in accordance with the utilization of a pattern carrying roller in accordance with the apparatus of the present invention. Thus, for example, the employment of a roller carrying a ridge 86 with holes 87 would produce a fabric after an initial migration which would have dark stripes including spots of a color substantially the same as the background. Similarly, employing a pattern carrying roller including projections 88 would provide a fabric after initial migration which would have a series of dark spots upon a lighter background, since the color or dye would tend to be migrated to the raised areas contacted by the heated roller.

Lastly, for example, a mottled effect could be produced by employing a heated roller having a ridge or series of ridges 89 having a knurled or serrated appearance. In this connection, a closely knurled roller will produce substantially an overall effect, i.e., an overall migration of the dye to the surface in contact with the heated roller, which overall effect is well defined, thereby providing a preference for such a knurled roller over a smooth roller, as described previously.

It should be clear from a review of FIG. 4, that any combination or variation of such three-dimensional design can be utilized to the effect that through the utilization of the present invention, any possible contrasting effect through the migration of dyes can be achieved. Thus, the apparatus of the present invention has the advantage of producing greater contrast than available with previously proposed apparatus in that migration can be sequentially effected on alternate surfaces of a flexible substrate, i.e., textile fabric to the effect that any degree of migration achieved through the single migration phenomenon can be accentuated.

While the above described operation of the novel apparatus of the present invention has been presented primarily with respect to the use of such apparatus for the migration of dyes, it is, of course, obvious that the apparatus disclosed and illustrated above can be employed to provide any and all types of heat-induced effects on a flexible substrate, i.e., textile fabric. Here again, reference is made to copending application Ser. No. 810,323 which indicates that a similar system can be suitably employed to produce a physical migration of dyes, chemicals, or pigments; heat fixation of dyes, chemicals, or pigments; development of dyes, chemicals, or pigments by the reaction of two or more components or by heat-induced transformation of an intermediate curing of crease-proofing agents, cross-linking agents, synthetic resins, natural gums, etc.; discharging or destroying of dyes, pigments, etc.; or drying of a flexible substrate.

Similarly, since the apparatus of the present invention employs first and second heating means capable of sequentially heat treating alternating sides of the flexible substrate, it is possible to provide combinations of such heat-induced physical and chemical effects.

The employment of the apparatus of the present invention for the physical migration of dyes, pigments, chemical, etc. is fully described above. The "heat-fixation" mentioned above, is meant to embrace any and all conventional processes by which a dyestuff or similar material is securely fixed to a textile fabric or similar flexible substrate by the application of heat. Thus, heat fixation as employed herein in connection with the improved apparatus of the present invention can include simultaneous diffusion and fixation of a dyestuff into a suitable textile fabric, simultaneous development and diffusion of a dyestuff or any other chemical process by which the heating of the textile fabric in some manner alters the state of a dyestuff or similar material applied thereto so that the same become securely attached to the textile material. Such phenomenon of fixation or heat-fixation applicably employed in accordance with the novel apparatus of the present invention is most suitably effected, for example, in the second heating means of the above described apparatus. Thus, for example, the first heating means can be employed to produce a preliminary or intermediate drying of the flexible substrate while the second heating means can be employed to produce the necessary fixation through the application of heat. Similarly, for example, the above described apparatus can be utilized to effect a continuous process whereby dye development is achieved by passing the flexible substrate, i.e., textile fabric, in contact with the first heating means while final fixation of the developed dye is achieved by contact of the textile fabric with the second heating means as previously described.

It is pointed out that a developing process as applicably employed in accordance with the apparatus of the present invention differs somewhat from the heat-fixation previously discussed in that in development chemical reactions take place by the application of heat to a flexible substrate, i.e., textile fabric, containing the necessary chemical reagents. Thus, included within the scope of such process which can be carried out on the apparatus of the present invention are the development of dyes, pigments, chemicals, or resinous components, i.e., any and all materials which can be suitably applied to a flexible substrate, e.g., textile fabric, and can be caused to react by the application of heat. Here again, as with all of the other types of processes which can be carried out on the apparatus of the present invention, such processes are improved by contacting the flexible substrate containing the necessary chemical reagents at the above described elevated temperature for only a very short period of time, that is, a fraction of a second or a minute.

In addition to the above described processes which can be carried out on the novel apparatus of the present invention, it is, of course, obvious that a continuous drawing and curing operation can be advantageously utilized. Thus, for example, the first heating means or section of the apparatus described above can be employed to provide a preliminary drying of the flexible substrate while the second heating means or section can be employed to effect a curing of an applied resinous material or similar chemical reagent. Thus, as employed herein, a curing operation which can be conducted through the use of the apparatus of the present invention can comprise the curing of a synthetic resin, i.e., by the application of heat. Such a procedure carried out on the apparatus of the present invention can be employed to produce permanent-press fabrics, for example, by the curing of a synthetic resin applied to a textile fabric or can be employed to cure a synthetic resin so as to permanently bond a dye or pigment to the textile material.

Similarly, other similar processes to produce heat-induced effects on flexible substrates, primarily textile fabrics, can be employed by utilizing the novel apparatus as set forth in the instant application. Thus, for example, discharging or destroying of dyes can be advantageously accomplished utilizing the instant apparatus, since such destruction of dyes or discharging of dyes occurs through the application of heat to a suitable substrate containing a discharge composition. Here again, such a procedure can be employed in combination with one or more similar procedures as set forth above in accordance with the apparatus of the present invention which combines at least a first and second heating means comprising a series of rollers, at least some of which are heated.

It should also be observed in accordance with the apparatus of the present invention that while each of the heating means has been described with respect to the employment of heated rollers at temperatures of from about 500 to about 1500° F., it should be obvious that the heated rollers of the first heating means need not be operated at the same temperature as the heated rollers of the second heating means, and in fact, the first and third heated rollers, for example, of the first heating means need not themselves be operated at the same temperature. It is only preferred in accordance with the present invention that each of the heated rollers operate at a temperature of from 500 to 1500° F. since it has been found that such temperature range is most effective to produce the heat-induced effects on the flexible substrate.

Additionally, while mention has been made of the tension that is employed in accordance with the use of the apparatus of the present invention and the use of compensating or tension rollers to effect the necessary tension as well as the necessary contact of the surface of the flexible substrate with the surface of the heated roller, it should be made clear that the apparatus of the present invention need not be operated within precise parameters. Thus, it is only necessary that the surface of the flexible substrate contact the heated roller sufficiently as to allow the production of the desired heat-induced effect. Contact of the flexible substrate and a sector of the heated roller is preferably, but not necessarily, less than 180°, such contact never being tangential. Additionally, it is noted that the tension is preferably within the range of from just about that necessary to remove wrinkles (or slackness) to the breaking point of the substrate. In addition to the compensating or tension rollers, the tension of the moving flexible substrate is controlled by a PIV (positively infinitely variable) drive governing the speed between entering and delivering nips of the apparatus.

It is lastly pointed out in accordance with the present invention that the instant apparatus provides a novel means for effecting any and all types of heat-induced effects on flexible substrates, primarily textile fabrics. Thus, in accordance with the present invention, an apparatus is provided which through a novel arrangement of heating means allows for the sequential heat treatment of alternating faces of a flexible substrate. Such arrangement as presented herein provides for the production of results not heretofore attainable with conventional prior art systems.

We claim:

1. Apparatus for effecting a chemical reaction or physical change on a flexible substrate by sequentially treating both sides of said flexible substrate with heat, said apparatus comprising in combination:

a first means to apply a liquid reagent to said flexible substrate;

a first heating means subsequent to said first means to apply a liquid reagent, said first heating means being adapted to apply heat to a first face of said flexible substrate, said first heating means comprising a first series of rollers, at least some of which are heated, so arranged that said flexible substrate is made to travel an undulating path around said rollers, whereby a first face of said flexible substrate only is brought into contact with the heated rollers of said first series of rollers, said heated rollers being heated to a temperature of from about 500 to about 1500° F.;

a second means to apply a second liquid reagent to said flexible substrate subsequent to passage of said flexible substrate over said first heating means;

and a second heating means subsequent to said second means to apply a liquid reagent to said flexible substrate, said second heating means being adapted to apply heat to the second face of said flexible substrate, said second heating means comprising a second series of rollers, at least some of which are heated, so arranged that said flexible substrate is made to travel an undulating path around said rollers, whereby the second face of said flexible substrate only is brought into contact with said heated rollers of said second series of rollers, said heated rollers of said second series of rollers being heated to a temperature of from about 500 to about 1500° F.

2. The apparatus of claim 1 wherein said apparatus additionally contains means to remove moisture from said flexible substrate located immediately after each of said first and second means to apply a liquid reagent to said flexible substrate.

3. The apparatus of claim 1 wherein said first heating means comprises a series of three rollers, the first and third rollers of which are heated.

4. The apparatus of claim 1 wherein said second heating means comprises a series of three rollers, the first and third rollers of which are heated.

5. The apparatus of claim 3 wherein at least one of said heated rollers carries a three-dimensional pattern.

6. The apparatus of claim 4 wherein at least one of said heated rollers carries a three-dimensional pattern.

7. The apparatus of claim 1 wherein each of said heated rollers of said first and second series of rollers is provided with a heat shield partly surrounding each of said heated rollers at a distance which allows passage of said flexible substrate between said heat shield and heated roller in contact therewith, while retaining substantially all of the heat of said roller around the immediate area thereof.

8. The apparatus of claim 1 wherein said rollers of said first and second series of rollers are driven by a chain drive driven by a motor, the chain being connected to each roller through a sprocket attached thereto.

9. The apparatus of claim 1 wherein one or more of said rollers of each of said first and second series of rollers is adjustable in position so as to be raised out of alignment with the other rollers of said first or second series of rollers to thereby eliminate the undulatory travel of said flexible substrate.

10. The apparatus of claim 9 wherein said apparatus additionally contains means to remove moisture from said flexible substrate located immediately after each of said first and second means to apply a liquid reagent to said flexible substrate.

11. The apparatus of claim 9 wherein said first heating means comprises a series of three rollers, the first and third rollers of which are heated.

12. The apparatus of claim 11 wherein said first and third rollers are adjustable in position.

13. The apparatus of claim 9 wherein said second heating means comprises a series of three rollers, the first and third rollers of which are heated.

14. The apparatus of claim 13 wherein said second roller is adjustable in position.

15. The apparatus of claim 11 wherein at least one of said heated rollers carries a three-dimensional pattern.

16. The apparatus of claim 13 wherein at least one of said heated rollers carries a three-dimensional pattern.

17. The apparatus of claim 9 wherein each of said heated rollers of said first and second series of rollers is provided with a heat shield partly surrounding each of said heated rollers at a distance which allows passage of said flexible substrate between said heat shield and heated roller in contact therewith, while retaining substantially all of the heat of said roller around the immediate area thereof.

References Cited

UNITED STATES PATENTS

| | | | |
|---|---|---|---|
| 2,144,685 | 1/1939 | Mellor et al. | 26—69 |
| 2,461,603 | 2/1949 | Hunter et al. | 26—69 |
| 2,667,426 | 1/1954 | Davis | 26—69 X |
| 2,808,635 | 10/1957 | Parker et al. | 26—18.6 X |
| 2,954,269 | 9/1960 | Fortess et al. | 25—69 X |

WILLIAM I. PRICE, Primary Examiner

U.S. Cl. X.R.

68—19, 22; 26—69